United States Patent

Mizutani et al.

[11] 4,278,262
[45] Jul. 14, 1981

[54] RUBBER BOOT FOR USE IN UNIVERSAL JOINT

[75] Inventors: Hitoshi Mizutani, Aichi; Zenji Nakajima; Yoshito Horikiri, both of Toyota; Hiroshi Harada, Takaishi; Yasushi Yokotsuji, Hirakata, all of Japan

[73] Assignees: Toyota Jidosha Kogyo Kabushiki Kaisha, Toyota; The Toyo Rubber Industry Co., Ltd., Osaka, both of Japan

[21] Appl. No.: 70,084

[22] Filed: Aug. 27, 1979

[30] Foreign Application Priority Data

Aug. 25, 1978 [JP] Japan ................................ 53-104206

[51] Int. Cl.³ ................................................ F16J 3/00
[52] U.S. Cl. ................................. 277/212 FB; 277/30; 74/18.2
[58] Field of Search ............... 277/212 R, 212 FB, 30, 277/31, 33; 74/18, 18.1, 18.2

[56] References Cited

U.S. PATENT DOCUMENTS

| 1,885,121 | 11/1932 | Loweke | 74/18.2 X |
|---|---|---|---|
| 1,922,431 | 8/1933 | Geyer | 74/18.1 X |
| 2,405,093 | 7/1946 | La Brie | 74/18.2 X |
| 2,432,803 | 12/1947 | Rice | 74/18.1 X |
| 3,033,046 | 5/1962 | Rodda | 74/18.1 |
| 3,416,379 | 12/1968 | Robbins | 74/18.1 |
| 3,511,061 | 5/1970 | Burckhardt | 277/212 X |
| 3,688,523 | 9/1972 | Schafer | 277/212 FB X |
| 3,704,894 | 12/1972 | Didszuhn | 277/212 FB |
| 3,790,985 | 2/1974 | Kessler | 74/18.1 X |
| 3,830,083 | 8/1974 | Hadlick et al. | 277/212 FB X |

FOREIGN PATENT DOCUMENTS 1032679 6/1958 Fed. Rep. of Germany ............ 74/18.2

Primary Examiner—Robert S. Ward, Jr.
Attorney, Agent, or Firm—Sughrue, Rothwell, Mion, Zinn and Macpeak

[57] ABSTRACT

A boot for covering the juncture between a drive shaft and a universal joint casing formed of a resilient material and having a small end portion and a large end portion with a bellows structure therebetween. The bellows has undulations with ridges and valleys with ridge angles determined such that contact between adjacent undulations when the boot is operatively connected is confined to a plane. Preferably, the thickness of the resilient material is greater in a longitudinally center portion than in the remaining portions of the bellows and the distance between neighbouring ridges in the central portion is greater than in the remaining portions.

9 Claims, 6 Drawing Figures

RUBBER BOOT FOR USE IN UNIVERSAL JOINT

BACKGROUND OF THE INVENTION

The invention relates to a rubber boot adapted to cover a joint portion interposed between a drive shaft and wheel shafts of an automobile or other motor vehicle.

Wheel shafts of an automobile are rotated through a drive shaft and an universal joint. As is well known, a joint box which encloses a universal joint and an outer surface of one end of the drive shaft are covered by a boot formed of a flexible material such as rubber to prevent dust or particulate materials from entering the gear box and to confine grease so as to lubricate the universal joint.

A conventional boot structure is shown in FIGS. 1 and 2 wherein a bellows-like boot has a small diameter portion A adapted to be secured to a drive shaft Xa and a large diameter portion B adapted to be secured to a joint box Xc. Between the large and small diameter portions, a plurality of annular ridges 1, 2, 3 and 4 are provided at equal intervals l. These ridges are radially oriented in the direction perpendicular to the axial direction of the drive shaft with the diameter of the ridges gradually increasing toward the larger diameter portion. Between respective neighbouring ridges, valleys 12, 13 and 14 are formed. Further, a first valley 11 and fifth valley 15 are provided immediately adjacent the small and large diameter portions, respectively.

For simplicity, the bellows of the boot is divided into a first portion adjacent to the small diameter portion A and a second portion adjacent to the large diameter portion B by the third valley. The first portion includes the first and second ridges 1, 2, first and second valleys 11, 12, first and second planers 1a, 2a facing toward the small diameter portion A, and opposite planes 1b, 2b facing toward the large diameter portion B. These first and second ridges 1, 2 are formed to have ridge angles $\theta_{1a}$ and $\theta_{2a}$, which are defined by the first plane 1a and a first diametrical plane $P_1$ and by the second plane 2a and a second diametrical plane $P_2$, respectively, of 0° to 6°, and angles $\theta_{1b}$ and $\theta_{2b}$, which are defined by the first opposite plane 1b and the first diametrical plane $P_1$ and by the second opposite plane 2b and the second diametrical plane $P_2$, respectively, of 30° to 38°.

The second portion includes third to fourth ridges 3, 4, fourth and fifth valleys 14, 15, third and fourth planes 3a, 4a facing toward the small diameter portion A, and opposite planes 3b and 4b facing toward the large diameter portion B. These third and fourth ridges 3, 4 are formed so as to have ridge angles $\theta_{3a}$ and $\theta_{4a}$, which are defined by the third plane 3a and a third diametrical plane $P_3$ and by the fourth plane 4a and a fourth diametrical plane $P_4$, respectively, of 11° to 17°, and angles $\theta_{3b}$ and $\theta_{4b}$, which are defined by the third opposite plane 3b and the third diametrical plane $P_3$ and by the fourth opposite plane 4b and the fourth diametrical plane $P_4$, respectively, of 45° to 70°.

As shown in FIG. 2, in case the joint angle $\alpha$ defined between the drive shaft Xa and the wheel shaft Xb should be 30° or more, an interior angle side of the boot is subject to a compression force P adjacent the large diameter portion along the direction shown by a first arrow and to tensile force E adjacent the small diameter portion A along the direction shown by a second arrow while an exterior angle side of the bellow is subject to a tensile force $E_1$ adjacent the large diameter portion B along the direction shown by a third arrow and to a compression force $P_1$ adjacent the small diameter portion A along the direction shown by a fourth arrow. At the portion of the bellows adjacent to the large diameter portion on the interior angle side, corrugations are in line contact with one another between the third opposite plane 3b and fourth plane 4a as indicated at 6 due to an undesirable folding of the bellows. This undesirable folding occurs when $\theta_{3b}$, $\theta_{4b}$ are larger than $\theta_{3a}$, $\theta_{4a}$ and when the width of 3b, 4b is larger than width of opposite planes 3a, 4b in combination with the compression force P.

If such line contact repeatedly takes place by the boot being rotated together with the drive shaft Xa, the bellows may be broken due to wear by normal rotation of the drive shaft Xa (for example, 400 r.p.m. 40 km/hr.). Further, there is a chance that the fifth valley 15 immediately adjacent to the large diameter portion will become entangled in the gap between the drive shaft Xa and the joint box Xc thereby also breaking the bellows. Furthermore, as mentioned the above, since the distance between neighbouring ridges is approximately equal, the boot is expanded in the radial direction thereof due to centrifugal force of the grease contained therein at high rotation speeds of the drive shaft (for example, 1800 r.p.m.), resulting in interference or rubbing between the radially expanded boot and neighbouring mechanical parts.

SUMMARY OF THE INVENTION

It is therefore an object of this invention to overcome the above-mentioned drawbacks and to provide an improved rubber boot.

A boot according to the present invention is intended to be connected between a drive shaft and a joint box which houses a universal joint therein. Such a boot has one end with a small diameter portion connected to the drive shaft with the other end having large diameter portion and being connected to the joint box. The diameters of valley portions adjacent to the large diameter portion are larger than those adjacent to the small diameter portion.

The object is attained in accordance with the invention by providing a boot having specifically defined ridge angles and distances between ridges of the bellows. That is, with regard to the ridges adjacent to the small diameter portion, each angle defined between a diametrical plane and a ridge plane facing a small diameter portion is in a range of 0° to 6° while each angle defined between the diametrical plane and an opposite ridge plane facing a large diameter portion is in a range of 30° to 38°. With respect to the ridges adjacent to the large diameter portion, each angle defined between a diametrical plane and a ridge plane facing the small diameter portion is in a range of 11° to 17° while an angle defined between the diametrical plane and an opposite ridge plane facing the large diameter portion is in a range of 0° to 35°. Further, the distance between the two adjacent ridges at the longitudinally center portion of the bellows is 1.5 to 1.8 times larger than the distances between those at remaining portions of the bellows.

The invention will be described with reference to the accompanying drawings and the description of the preferred embodiment.

DETAILED DESCRIPTION OF THE INVENTION

Figure 1:
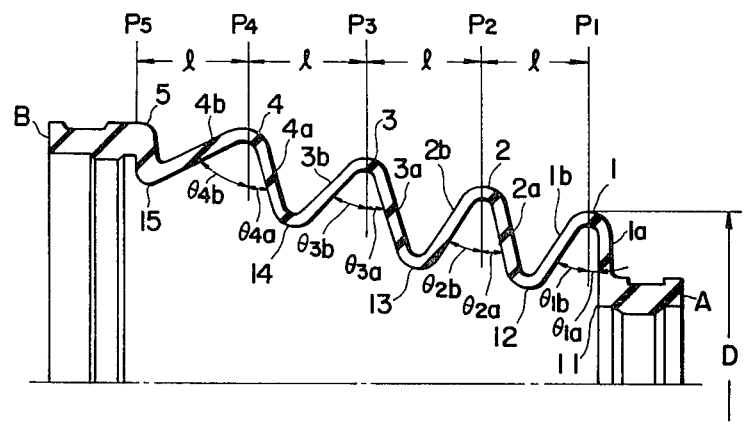
FIG. 1 shows a longitudinal cross-sectional view of a conventional boot structure.
Figure 2:
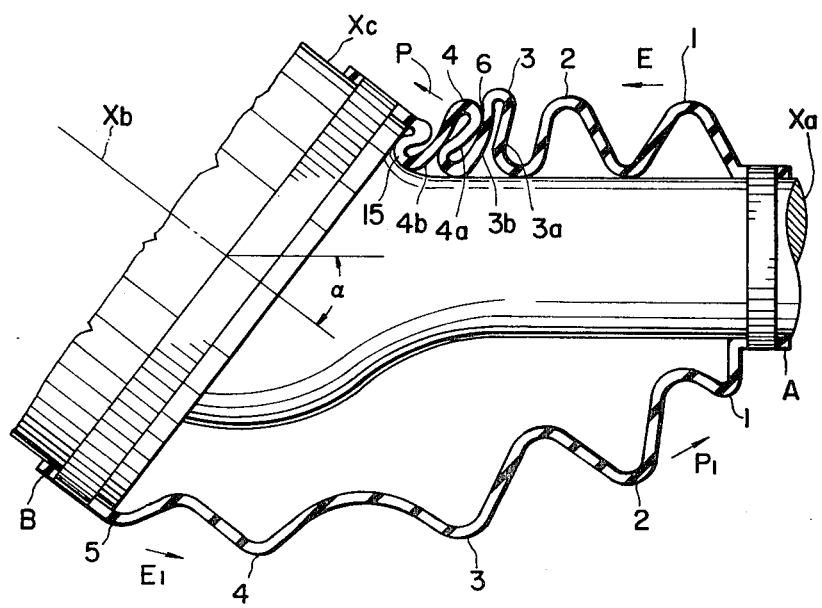
FIG. 2 shows a longitudinal cross-sectional view of a conventional boot structure wherein a large joint angle is provided.
Figure 3:
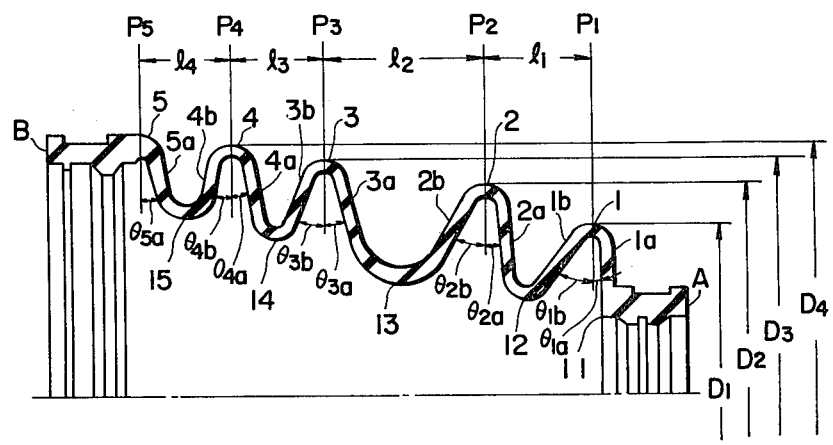
FIG. 3 shows a longitudinal cross-sectional view of a boot structure according to the invention.

Referring now to the drawings, and initially to FIG. 3, first and second ridges 1, 2 are each located adjacent to a small diameter portion A. A first ridge plane 1a extends radially outwardly. Angles $\theta_{1a}$, $\theta_{2a}$, defined respectively between a diametrical plane $P_1$ and a first ridge plane 1a facing the small diameter portion A and between a diametrical plane $P_2$ and a second ridge plane 2a facing the small diameter portion, are in a range of 0° to 6°. Angles $\theta_{1b}$ and $\theta_{2b}$, each defined by opposite first and second ridge planes 1b, 2b relative to diametrical planes $P_1$, $P_2$ respectively, are in a range of 30° to 38°. Both these angles are substantially the same as the corresponding angles of the conventional boot structure. Further, the distance 1 between the first and second ridges is substantially the same as that of the conventional boot.

In contrast to the conventional boot structure, with regard to third and fourth ridges 3, 4 adjacent to a large diameter portion B, angles $\theta_{3a}$, $\theta_{4a}$, each defined by third and fourth ridge planes 3a, 4a facing small diameter portion B relative to diametrical planes $P_3$, $P_4$ respectively, are in a range of 11° to 17°. Angles $\theta_{3b}$, $\theta_{4b}$, each defined by third and fourth opposite planes 3b, 4b relative to diametrical planes $P_3$, $P_4$, respectively, are in a range of 0° to 35°. Moreover, the inventive structure has a fifth plane 5a which extends radially inwardly. An angle $\theta_{5a}$, defined between a diametrical plane $P_5$ and the fifth plane 5a, is in a range of 0° to 6°. With these angular arrangement, the distance $l_3$ between third and fourth ridges 3, 4 and the distance $l_4$ between fourth and fifth ridges 5 are slightly smaller than the distance $l_1$ between the first and second ridges 1 and 2 due to the reduction of the angles $\theta_{3b}$ and $\theta_{4b}$ in comparision with the corresponding parameters of the conventional boot. As a result, the distance $l_2$ between the second and third ridges 2, 3 is 1.5 to 1.8 times larger than the distance $l_1$, $l_3$, $l_4$.

Figure 4:
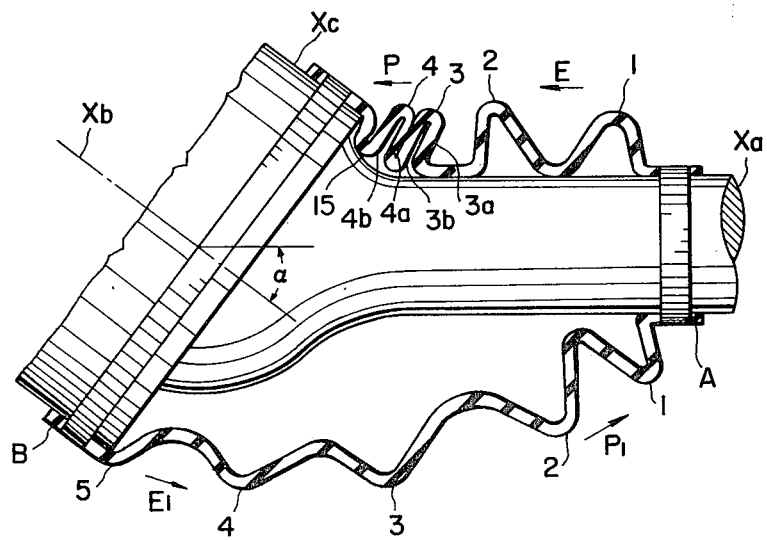
FIG. 4 shows a longitudinal cross-sectional view of a boot structure according to the invention wherein a large joint angle is provided.

With the boot thus provided, if the joint angle α defined between the drive shaft Xa and the wheel shaft Xb becomes 30° or more, the interior angle side of the ridges 3, 4 adjacent to the large diameter portion B is subject to a compression force P along the direction shown by a first arrow in FIG. 4. In this case, the ridges 3, 4 are sufficiently folded so that the plane 4a and opposing plane 3b are in planar contact with each other as opposed to the line contact in the prior art structure so that the probability of breakage of the bellows due to frictional wear during normal rotation of the drive shaft is reduced. Entanglement of the valley 15 adjacent to the large diameter portion B in the gap between the drive shaft Xa and the joint box Xc is also avoided. Furthermore, since the distance between the two adjacent ridges at the longitudinally center portion of the boot is larger than that between the adjacent ridges in the remaining portions, the third valley 13 between the central ridges provides sufficient rigidity in the diametrical direction to restrain radially outward deformation or expansion of the boot due to centrifugal force due to high speed rotation of the drive shaft.

The boot is formed of rubber and preferably has a thickness of 1.8 to 3.5 mm. Preferably, the thickness of the material in the third valley and the portion adjacent thereto is 1.35 to 1.6 times larger than in the remaining portions. With this structure, radially outward expansion of the boot is further restrained.

According to the foregoing embodiment, four ridges are formed. However, the number of ridges may be determined in accordance with the axial length of the boot. For example, the number of ridges may be three to six, preferably four to five.

The rubber boot according to this invention performs excellently as a covering or shield for a joint portion adapted to be connected between a drive shaft and wheel drive shaft in a front-wheel drive vehicle. Such a rubber boot is particularly well adapted for a tripod-type joint which requires a large joint angle.

The invention will be further described by way of the following example and test results.

EXAMPLE

Rubber boots were constructed according to the invention and the conventional rubber boot. Both boots had outer diameters of the small and large diameter portions of 36 mm and 89 mm, respectively. The axial length of these boots was 110 mm and the thickness thereof was 2.2 mm.

Details of sizes of these rubber boots are specified below Table 1.

TABLE 1

|  |  | Rubber Boot According to the Invention | Conventional Rubber Boot |
| --- | --- | --- | --- |
| Distance Between | $l_1$ | 18.8 | 18.3 |
| Neighbouring | $l_2$ | 28.0 | 20.5 |
| Ridges (mm) | $l_3$ | 16.0 | 21.0 |
|  | $l_4$ | 15.5 | 18.5 |
| Angle of Ridge | $\theta_{1a}$ | 3 | 0 |
| Planes Relative | $\theta_{1b}$ | 36 | 32 |
| to Diametrical | $\theta_{2a}$ | 6 | 10 |
| Plane (degrees) | $\theta_{2b}$ | 30 | 32 |
|  | $\theta_{3a}$ | 16 | 16 |
|  | $\theta_{3b}$ | 23 | 49 |
|  | $\theta_{4a}$ | 13 | 12 |
|  | $\theta_{4b}$ | 11 | 68 |
| Outer Diameter | $D_1$ | 87 | 87 |
| of Ridges (mm) | $D_2$ | 81 | 80 |
|  | $D_3$ | 74 | 77 |
|  | $D_4$ | 58 | 58 |
| Thickness of Third Valley (mm) |  | 3.0 | 2.2 |

The two boots were both mounted between a drive shaft and the joint box. The drive shaft was continuously rotated at 400 r.p.m. while the joint angle α was varied as a parameter. The length of time to breakage was measured for each value of α chosen. The test results data is shown in FIG. 5 which shows that the boot of the invention had a significantly longer service life than the conventional boot.

Further, these boots were rotated at 1,800 r.p.m. at an ambient temperature of 75° C. and the radial expansion of rubber boots (degree of expansion) relative to rubber hardness was tested. The test result shown in FIG. 6 disclose the superior performance of the boot of the invention.

Figure 5:
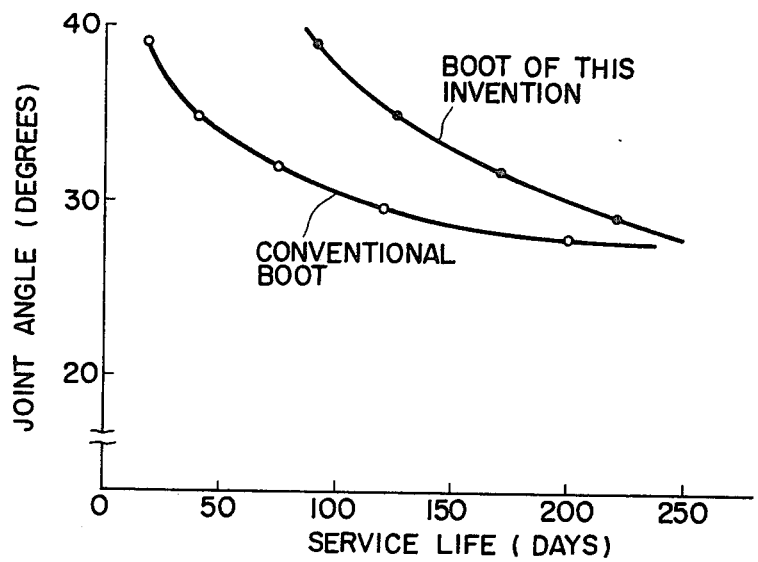
FIG. 5 is a graphical representation showing the relationship between the joint angle and service life of the boot.
Figure 6:
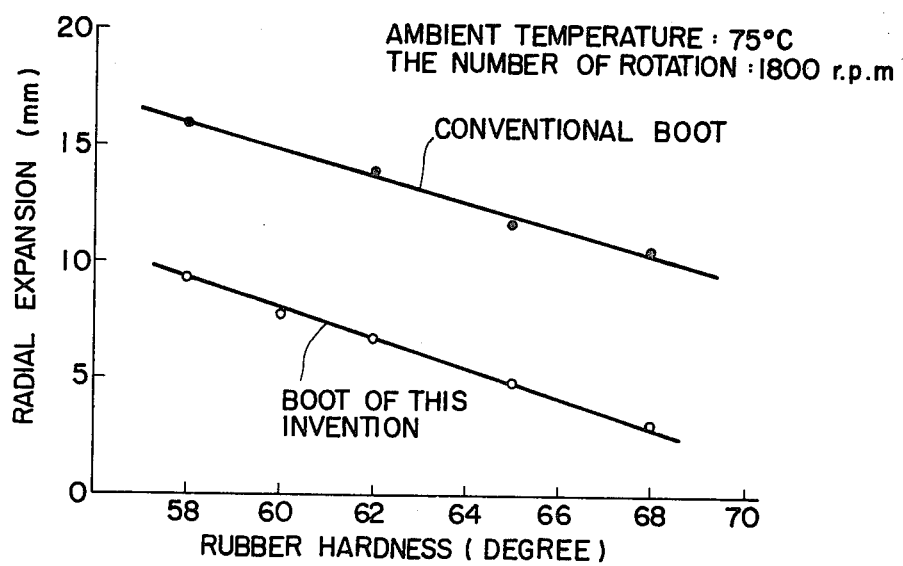
FIG. 6 is a graphical representation showing the relationship between rubber hardness and the radial expansion of the boot during high speed rotation.

As is evident from FIG. 5, when the joint angle exceeds 30°, the service life of the rubber boot according to the invention is far greater than that of the conventional rubber boot. Moreover, as illustrated by FIG. 6, the radial expansion of the boot of the invention is much smaller than that of the conventional boot regardless of the rubber hardness.

While the invention has been described in detail and with reference to a specific embodiment thereof, it will be apparent to one skilled in the art that various changes and modifications can be made thereto without departing from the spirit and scope of the invention.

What is claimed is:

1. A boot having one end formed with a small diameter portion adapted to be connected to a drive shaft and having the other end formed with a large diameter portion adapted to be connected to universal joint casing, said boot comprising a bellows structure having alternating ridges and valleys with valleys adjacent to said large diameter portion having diameters larger than those of valleys adjacent to said small diameter portion, the ridges adjacent to said small diameter portion having ridge planes facing toward said small diameter portion and opposite ridge planes facing toward said large diameter portion wherein the angles of each of said ridge planes relative to corresponding diametrical planes which pass through each of said ridges are in a range of 0° to 6° and angles of corresponding opposite ridge planes relative to said diametrical planes are in a range of 30° to 38°, the ridges adjacent to said large diameter portion having ridge planes each facing toward said small diameter portion and opposite ridge planes each facing toward said large diameter portion wherein the angles of each of said ridge planes relative to corresponding diametrical planes which pass through each of said ridges are in a range of 11° to 17° and angles of corresponding opposite ridge planes relative to each of said diametrical planes are in a range of 0° to 35°, and the distance between two neighbouring ridges positioned at a longitudinally center portion of said boot being 1.5 to 1.8 times greater than the distance between adjacent ridges in remaining portions thereof.

2. The boot of claim 1 wherein the radial thickness of the valley portion at said longitudinally center portion of the boot is 1.35 to 1.6 times larger than that of the remaining portions thereof.

3. A boot adapted for covering a juncture between a drive shaft and a joint casing, said boot comprising; a resilient material formed as a bellows having plural ridges and valleys, the thickness of said resilient material in a longitudinally center portion of said bellows being greater than the thickness of said material in remaining portions thereof, and the distance between two adjacent ridges in said center portion is greater than the distances between adjacent ridges in remaining portions.

4. The boot of claim 3 wherein said thickness of said material in said center portion is between 1.35 and 1.6 times as great as the thickness of said material in said remaining portions.

5. The boot of claim 3 wherein said distance between two adjacent ridges in said center portion is 1.5 to 1.8 times greater than said distance between said adjacent ridges in said remaining portions.

6. A boot comprising a small diameter end portion and a large diameter end portion and a bellows structure between the end portions, said bellows structure having undulations with alternating ridges and valleys, the angles of ridge planes of said bellows structure relative to diametrical planes passing through said ridges are in a range of 0° to 6° and angles of each of ridge planes relative to corresponding planes which pass through each of said ridges are in a range of 11° to 17° such that contact between adjacent undulations upon said boot being operatively mounted and operated occurs along a plane.

7. A boot comprising first and second end portions and a bellows structure therebetween, said bellows structure comprising a plurality of ridges and valleys with at least four ridges, the distance between two adjacent ridges in a longitudinally center portion of said bellows structure being greater than the distance between adjacent ridges in remaining portions of said bellows structure.

8. The boot of claim 7 wherein said distance between said two adjacent ridges in said center portion is 1.5 to 1.8 times greater than said adjacent ridges in said remaining portions.

9. The boot of claim 7 wherein the radial thickness of the valley portion at said longitudinally center portion is 1.35 to 1.6 times larger than in said remaining portions.

* * * * *